(12) United States Patent
Kawada

(10) Patent No.: US 8,395,535 B2
(45) Date of Patent: Mar. 12, 2013

(54) PHOTOELECTRIC ENCODER

(75) Inventor: Hiroaki Kawada, Kawasaki (JP)

(73) Assignee: Mitutoyo Corporation, Kawasaaki-Shi (JP)

( * ) Notice: Subject to any disclaimer, the term of this patent is extended or adjusted under 35 U.S.C. 154(b) by 134 days.

(21) Appl. No.: 13/103,161

(22) Filed: May 9, 2011

(65) Prior Publication Data

US 2011/0272564 A1 Nov. 10, 2011

(30) Foreign Application Priority Data

May 10, 2010 (JP) ................................ 2010-108587
May 10, 2010 (JP) ................................ 2010-108750

(51) Int. Cl.
*H03M 1/22* (2006.01)
(52) U.S. Cl. ............... 341/13; 250/231.13; 250/231.16; 250/231.18
(58) Field of Classification Search ............... 341/13; 250/231.13, 231.16, 231.18
See application file for complete search history.

(56) References Cited

U.S. PATENT DOCUMENTS

| 3,387,139 | A | | 6/1968 | Gerard et al. | |
|---|---|---|---|---|---|
| 3,496,374 | A | | 2/1970 | Burr et al. | |
| 5,068,529 | A | * | 11/1991 | Ohno et al. | 250/231.18 |
| 7,223,963 | B2 | * | 5/2007 | Okada et al. | 250/231.13 |
| 7,276,687 | B2 | * | 10/2007 | Okada | 250/231.13 |
| 7,348,544 | B2 | * | 3/2008 | Atsuta et al. | 250/231.13 |
| 7,348,546 | B2 | * | 3/2008 | Schoser et al. | 250/231.13 |
| 2004/0222365 | A1 | * | 11/2004 | Tobiason | 250/231.13 |
| 2005/0109924 | A1 | | 5/2005 | Christenson et al. | |
| 2007/0045526 | A1 | * | 3/2007 | Saidan et al. | 250/231.13 |
| 2008/0315135 | A1 | | 12/2008 | Okada | |
| 2009/0027692 | A1 | * | 1/2009 | Zwilling et al. | 356/617 |
| 2010/0072348 | A1 | | 3/2010 | Takahashi | |

FOREIGN PATENT DOCUMENTS

| EP | 0871013 A2 | 10/1998 |
|---|---|---|
| JP | 60-120215 | 6/1985 |
| JP | 60-120216 | 6/1985 |
| JP | 07-286861 | 10/1995 |
| JP | 2004-239829 | 8/2004 |
| JP | 2005-083808 | 3/2005 |
| JP | 2005-283357 | 10/2005 |
| JP | 2009-293973 | 12/2009 |

* cited by examiner

*Primary Examiner* — Jean B Jeanglaude
(74) *Attorney, Agent, or Firm* — Rankin, Hill & Clark LLP

(57) ABSTRACT

A photoelectric encoder has a scale in which a main track for detecting an amount of movement is formed in a measuring direction. The photoelectric encoder includes an origin signal generating portion provided at a part of the main track in a direction orthogonal to the measuring direction. Thereby, change in a light receiving signal due to passage of the origin signal generating portion is detected to generate an origin signal. Thus, the origin signal which is in agreement with a main signal in phase is obtained and improve the reproducibility of an origin position.

11 Claims, 12 Drawing Sheets

Moving direction

PRIOR ART

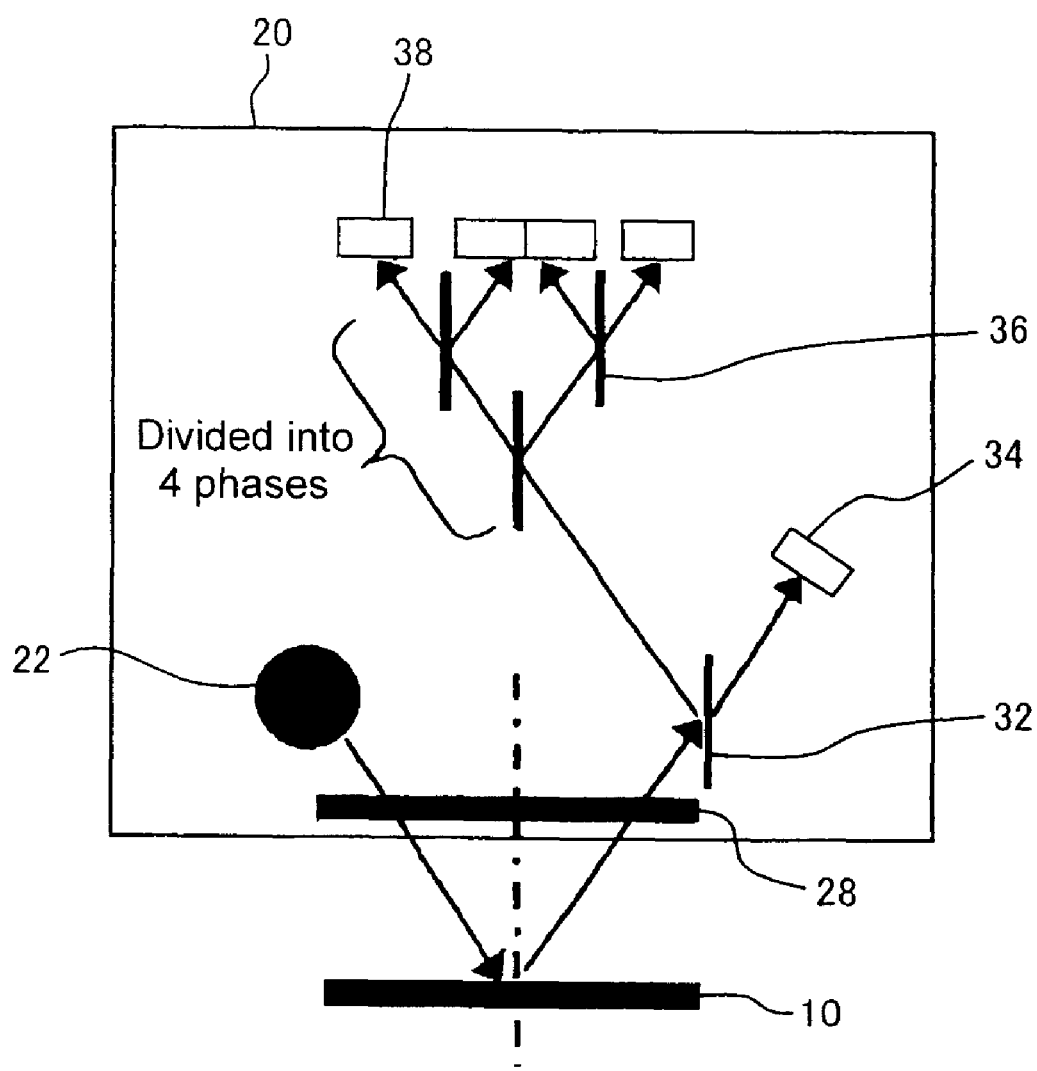

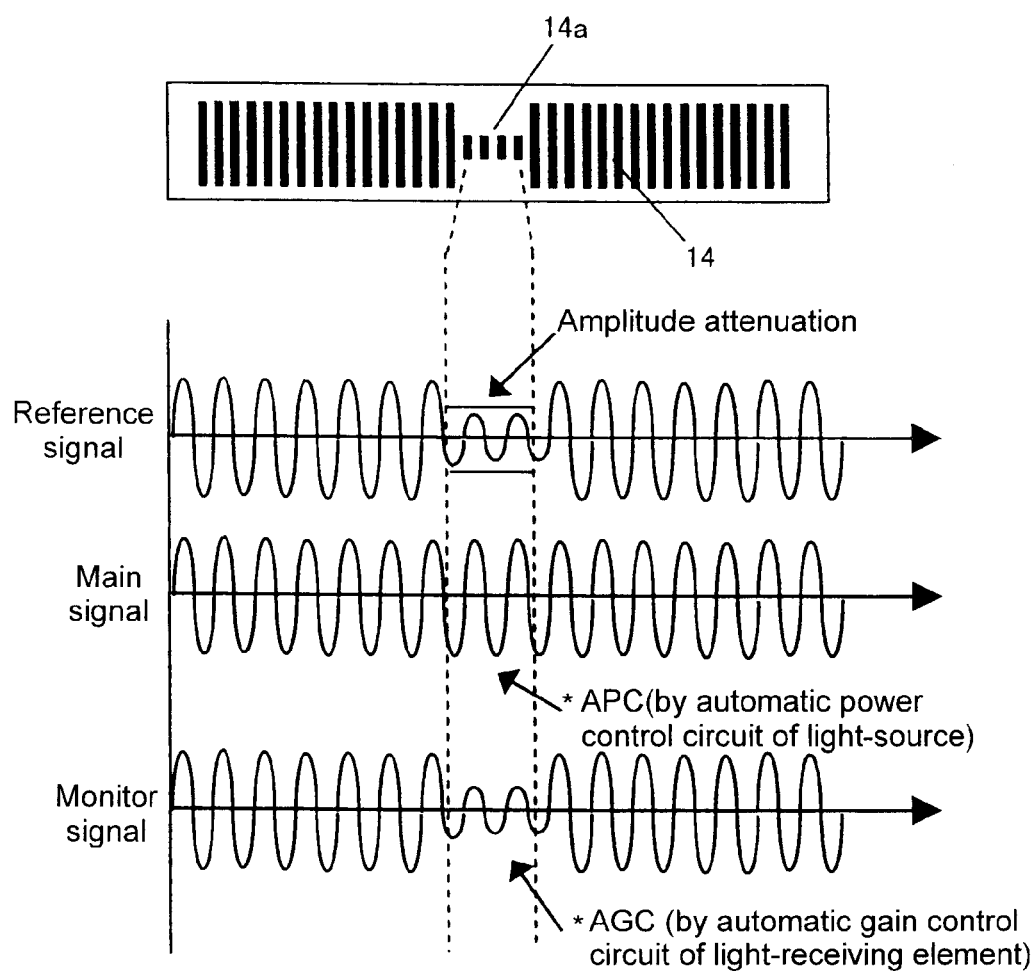

Moving direction

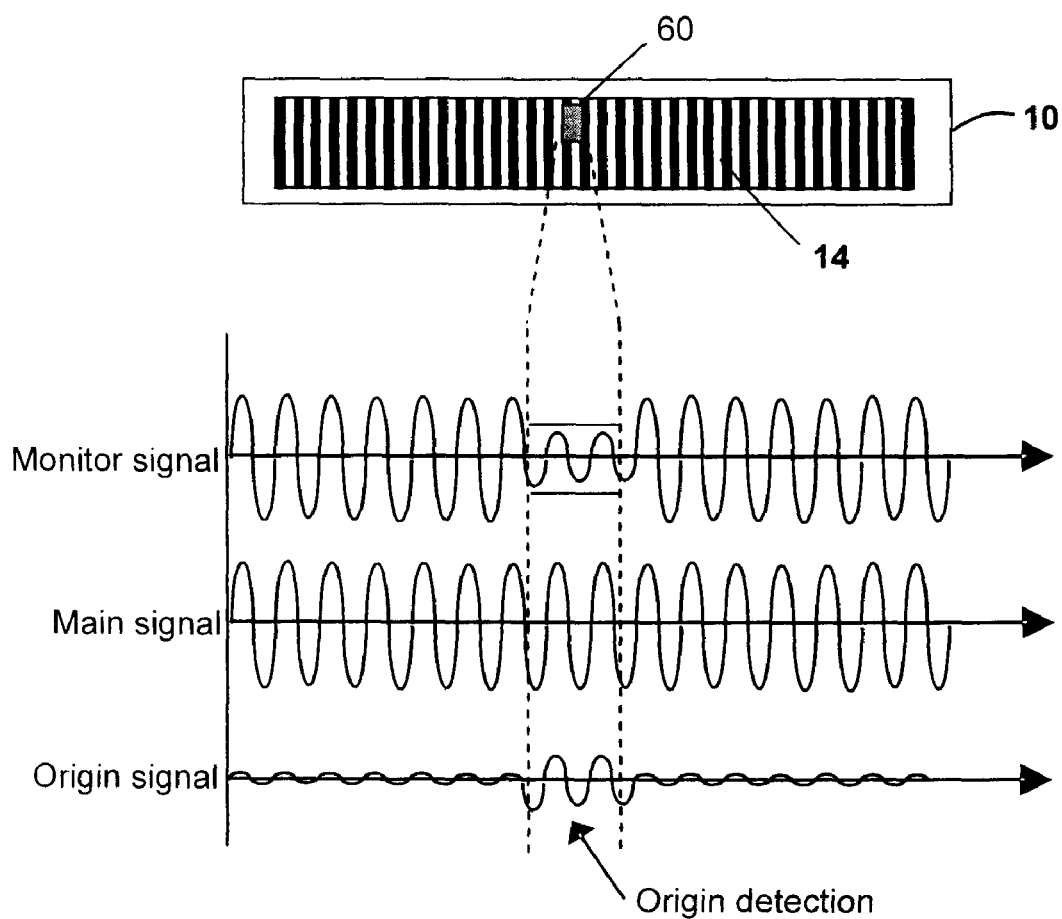

PHOTOELECTRIC ENCODER

CROSS-REFERENCE TO RELATED APPLICATION

The disclosures of Japanese Patent Application No. 2010-108750 filed on May 10, 2010 and Japanese Patent Application No. 2010-108587 filed on May 10, 2010 including specifications, drawings and claims are incorporated herein by reference in its entirety.

BACKGROUND OF THE INVENTION

1. Field of the Invention

The present invention relates to a photoelectric encoder, and in particular to a photoelectric encoder favorably used in incremental type encoders such as a linear encoder, a circular encoder and a rotary encoder and capable of improving the reproducibility of an origin position.

2. Description of the Related Art

An incremental type encoder in which a relative amount of movement of a scale with respect to a detector is detected by an increment has been widely used. The incremental type encoder is characterized in that it does not require arrangement of many tracks in a width direction orthogonal to a measuring direction of the scale, as compared with an absolute encoder which detects an absolute position, and is simple in constitution. On the other hand, immediately after the incremental type encoder is powered on or where a relationship thereof with respect to a reference position is deviated due to some reason, the deviation cannot be corrected by an incremental signal alone. Therefore, as shown in FIG. 1A (side view) and FIG. 1B (plan view), on a scale 10 in which a main track 14 for detecting an amount of movement is formed in a moving direction (measuring direction), there is installed an origin track 16 along with the main track 14. And, soon after the encoder is powered on, passage of the origin track 16 is detected to correct an incrementally measured position (Japanese Published Examined Patent Application No. H03-60041 (hereinafter, referred to as Patent Document 1), Japanese Published Examined Patent Application No. H03-60042 (hereinafter, referred to as Patent Document 2), Japanese Published Unexamined Patent Application No. H07-286861 (hereinafter, referred to as Patent Document 3), Japanese Published Unexamined Patent Application No. 2004-239829 (hereinafter, referred to as Patent Document 4), Japanese Published Unexamined Patent Application No. 2005-83808 (hereinafter, referred to as Patent Document 5). In the drawings, the reference numeral 20 denotes a detector which includes a light source 22, a light receiving element 24 for main signal arranged so as to oppose the main track 14 and a light receiving element 26 for origin signal arranged so as to oppose the origin track 16.

However, a conventional photoelectric incremental type encoder is independently provided on a scale 10 with a main track 14 for detecting a main signal and an origin track 16 for detecting an origin signal. Further, whereas the light receiving element 24 for main signal is constituted with a light receiving element array capable of reading a relative position, the light receiving element 26 for origin signal is to detect only whether the origin track 16 is present or not by referring to an amount of light received. Therefore, there is found such a problem that due to an optical variance of the tracks and an optical system as well as an electrical variance of a processing circuit, a phase deviation takes place between a main signal and an origin signal to easily cause lower reproducibility of an origin position.

Patent Document 1 has described the installation of an origin detecting portion within the main track. However, since the main track is discontinuous or interrupted by the origin detecting portion, it is impossible to prevent the phase deviation between the main signal and the origin signal.

SUMMARY OF THE INVENTION

The present invention has been made for solving the above-described conventional problem and an object thereof is to improve the reproducibility of an origin position.

The present invention is a photoelectric encoder having a scale in which a main track for detecting an amount of movement is formed in a measuring direction. And the photoelectric encoder is provided with an origin signal generating portion installed at a part of the main track in a direction orthogonal to the measuring direction, thereby detecting change in a light receiving signal due to passage of the origin signal generating portion to generate an origin signal, thus solving the above-described problem.

In this instance, it is possible to make narrower a track width of the origin signal generating portion than track widths of other portions.

It is also possible to form the origin signal generating portion by concealing a part of the main track with a film.

Alternatively, it is possible to form the origin signal generating portion by using a scale protective film.

Further, the photoelectric encoder is additionally provided with a light-source automatic power control circuit for giving feedback control to a main track illuminating light source so as to make constant the light receiving signal obtained from the main track, an automatic gain control circuit for attenuating a light receiving signal by an increment of the light emitting intensity by the light-source automatic power control circuit to give a monitor signal, and an origin signal generating circuit for generating the origin signal on the basis of a difference between the main signal and the monitor signal.

Further, the origin signal generating portion may be a monitor signal generating portion different in light permeability from the main track. It can be provided with light receiving element for detecting main signal and a light-receiving element for detecting monitor signal, installed together in a direction orthogonal to the measuring direction so as to output in-phase signals with respect to the movement of the scale and an origin signal generating circuit for generating the origin signal on the basis of a difference between the main signal and the monitor signal.

In this instance, the monitor signal generating portion may be a portion which is formed on a scale protective film and different in permeability from the scale protective film.

Alternatively, the monitor signal generating portion may be formed by processing a part of the main track.

According to the present invention, a monitor signal for detecting a main signal and an origin signal is generated by using the same main track. Therefore, the main signal is in agreement with the monitor signal in phase, and it is possible to obtain the origin signal in agreement with the main signal in phase by using the monitor signal and improve the reproducibility of an origin position.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein;

FIG. 3 is a cross sectional view which shows in detail a detector of Embodiment 1;

FIG. 4 is a drawing which shows a relationship between a reference signal, a monitor signal and a main signal which are made incident into the detector;

FIG. 13 is a drawing which exemplifies signals from various portions of Embodiment 4.

DETAILED DESCRIPTION OF THE PREFERRED EMBODIMENTS

Hereinafter, a detailed description will be given of embodiments of the present invention with reference to the drawings.

Figure 2A:
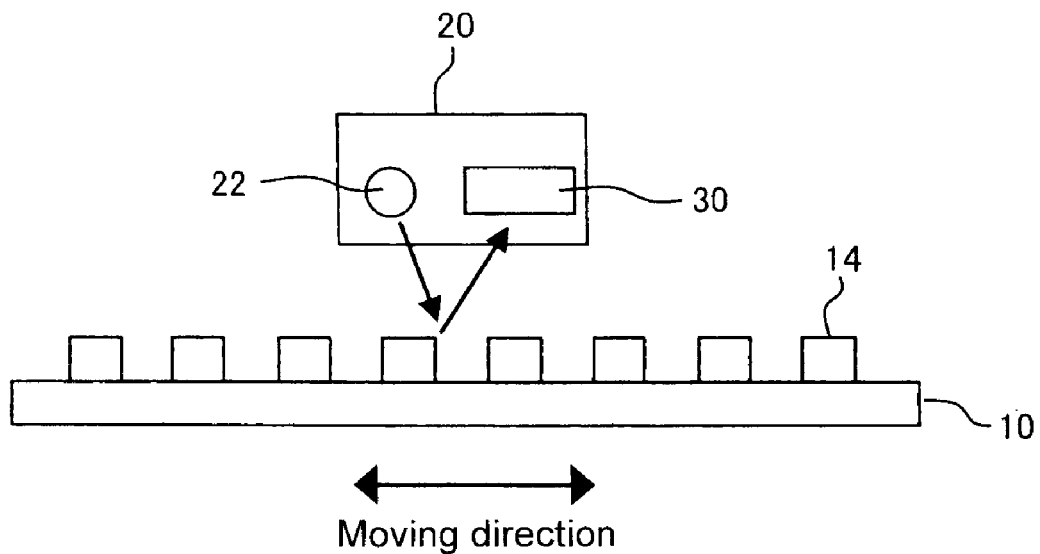
FIG. 2A is a side view which shows a constitution of Embodiment 1 of the present invention and FIG. 2B is a plan view thereof.
Figure 2B:
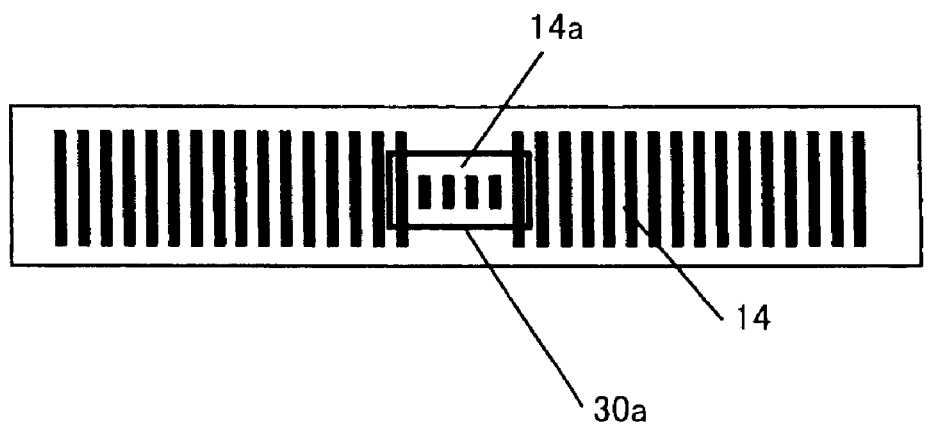

FIG. 2A (side view) and FIG. 2B (plan view) show a constitution of Embodiment 1 of the present invention.

Figure 1A:
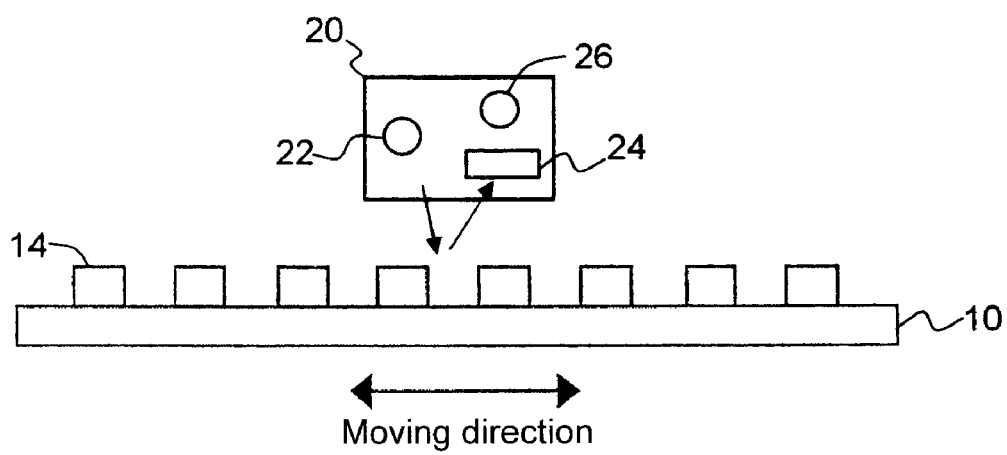
FIG. 1A is a side view for explaining a problem of a conventional photoelectric encoder and FIG. 1B is a plan view thereof.

As shown in FIG. 2A, the detector 20 of the present embodiment is provided with a light source 22 and a light receiving portion 30 as with a conventional example shown in FIG. 1A.

As shown in FIG. 2B, only one main track 14 is arranged on a scale 10 used in the present embodiment. A portion which is narrower in track width than a detection range 30a of the light receiving portion 30 is arranged as an origin detecting portion 14a at a single site or a plurality of sites in a moving direction (measuring direction) of the scale 10.

As shown in FIG. 3, the detector 20 is provided with an index scale 28 for forming a contrasting reference signal in collaboration with the main track 14 on the scale 10, a branching beam splitter 32 which is an optical system for branching a reference signal obtained by the index scale 28 and detected for an amount of movement into a main signal and a monitor signal, a light receiving element 34 for monitor signal, beam splitters 36 for dividing the main signal branched by the branching beam splitter 32 into four phases, for example, and a light receiving element 38 for main signal which receives each of the phases. In this instance, both the main signal and the monitor signal are signals branched from the reference signal and, therefore, they are the same in phase.

Figure 1B:
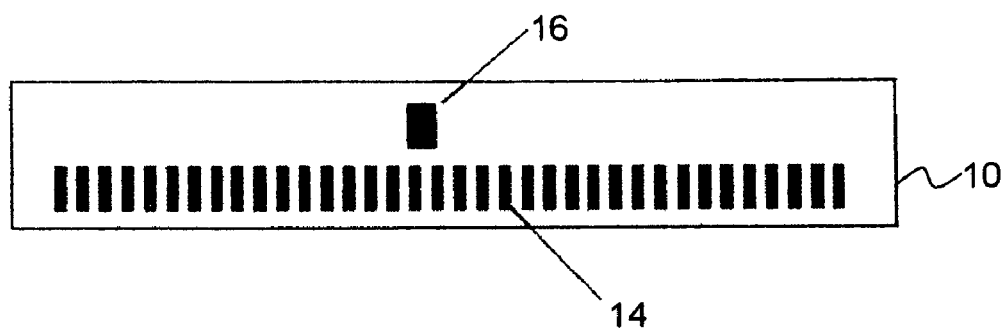

Other constitutions are the same as those of the conventional example shown in FIG. 1A and FIG. 1B, and description thereof is therefore omitted here.

Figure 5:
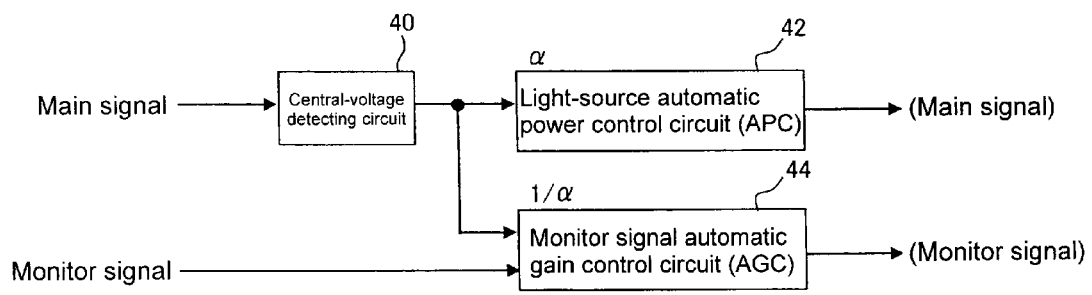
FIG. 5 is a circuit diagram which shows a part of a signal processing circuit of Embodiment 1.

When the origin detecting portion 14a of the scale 10 shown in FIG. 2B opposes the detector 20 shown in FIG. 3, as shown in FIG. 4, the reference signal is made small in amplitude. At this time, in order to keep the amplitude of the main signal, the light intensity of the light source 22 is subjected to feedback control in such a manner that the amplitude of the main signal is made constant by a light-source automatic power control circuit (APC) 42 according to the amplitude of the main signal detected by a central-voltage detecting circuit 40 shown in FIG. 5. On the other hand, the monitor signal allows the gain of the monitor signal to decrease to $1/\alpha$ by an automatic gain control circuit (AGC) 44 in accordance with an increment of $\alpha$ by the APC 42.

Figure 6:
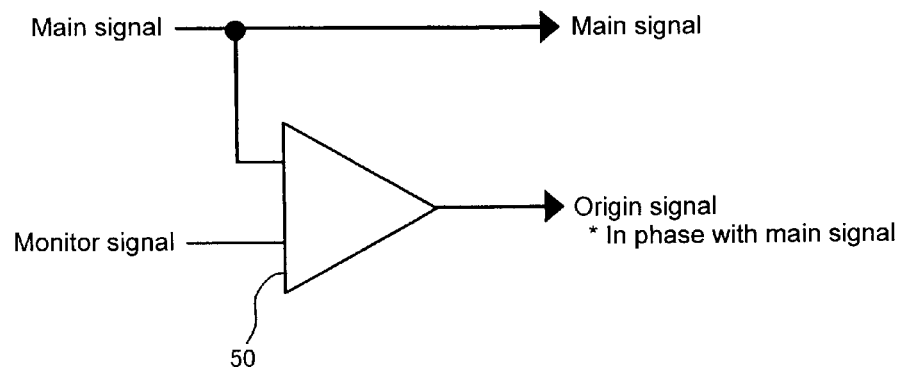
FIG. 6 is a circuit diagram which shows another part of the signal processing circuit.
Figure 7:
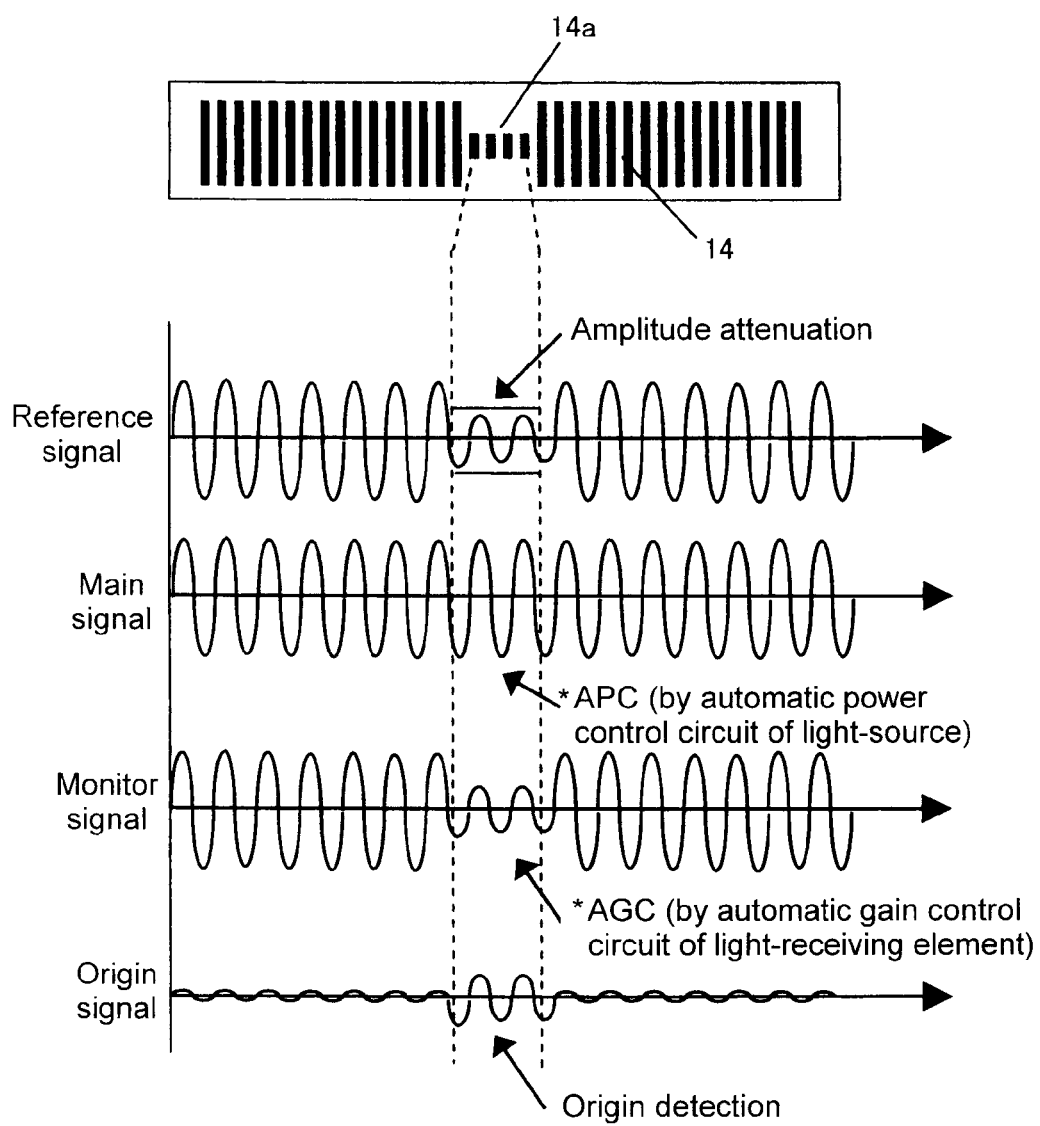
FIG. 7 is a drawing which shows signal waveforms at various portions of Embodiment 1.

Therefore, a differential circuit 50 which uses the monitor signal and the main signal shown in FIG. 6 is internally housed at a processing circuit of the detector 20. Thereby, an origin signal shown in FIG. 7 is generated.

Usually, a level of the amplitude of the origin signal is decreased greatly. However, where the detector 20 opposes the origin detecting portion 14a of the scale 10, the level of the amplitude is increased, thus making it possible to detect the origin.

In this instance, since the same main track 14 of the scale 10 is used to detect the main signal and the origin signal, both signals are constantly equal in phase relationship, thereby improving the reproducibility of the origin.

Figure 8A:
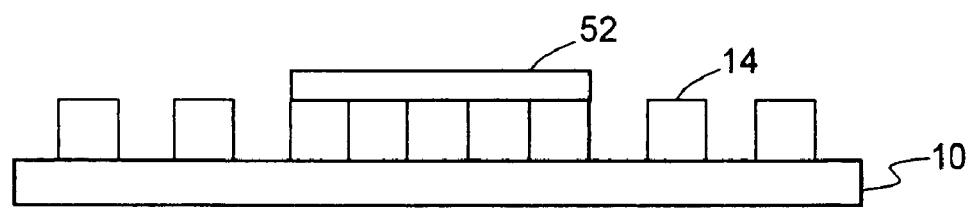
FIG. 8A is a side view which shows a major constitution of Embodiment 2 of the present invention.
Figure 8B:
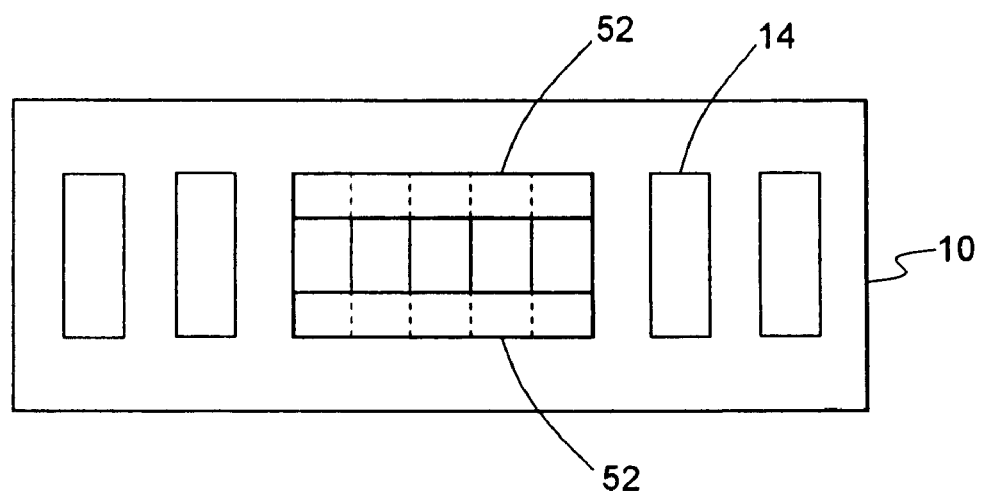
FIG. 8B is a plan view thereof.
Figure 9A:
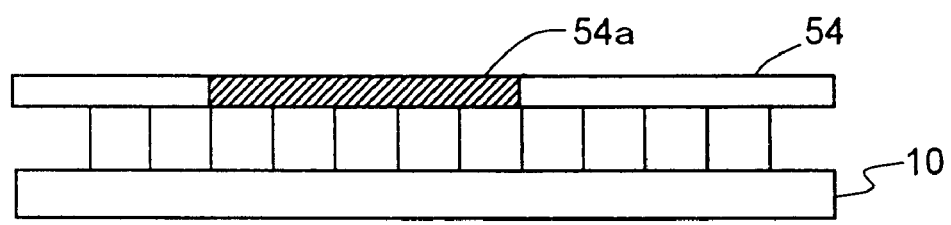
FIG. 9A is a side view which shows a major constitution of Embodiment 3 of the present invention and FIG. 9B is a plan view thereof.
Figure 9B:
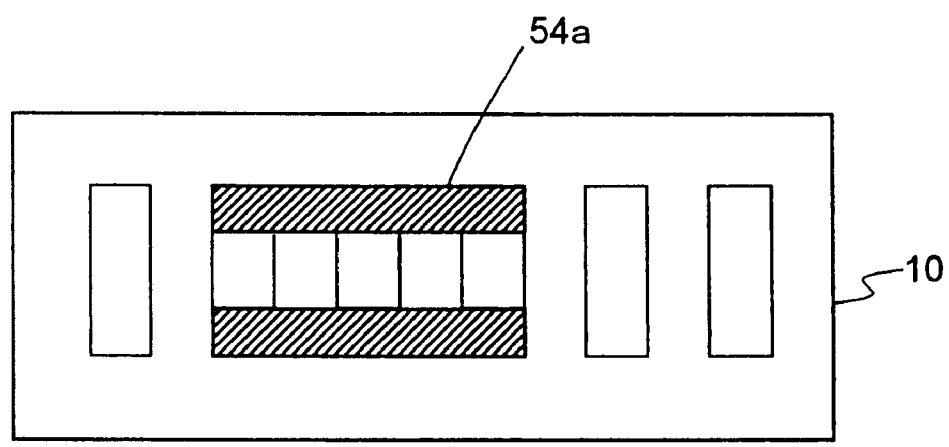

In Embodiment 1, the origin detecting portion 14a is formed by narrowing the width of the main track 14 itself. However, a method for constituting the origin detecting portion 14a is not limited thereto. As in Embodiment 2 shown in FIG. 8A (side view) and FIG. 8B (plan view), the origin detecting portion 54a can be formed by concealing a part of the main track 14 with a film 52, or as in Embodiment 3 shown in FIG. 9A (side view) and FIG. 9B (plan view), the origin detecting portion 54a can also be formed by using a protective film 54 such as glass or a plastic film for preventing the scale 10 from being blurred or damaged.

In the previous embodiments, all of the origin detecting portions 14a are formed at the center of the main track 14 in the width direction. However, they may be formed so as to be spaced away from the center and placed to one side, for example.

Figure 10A:
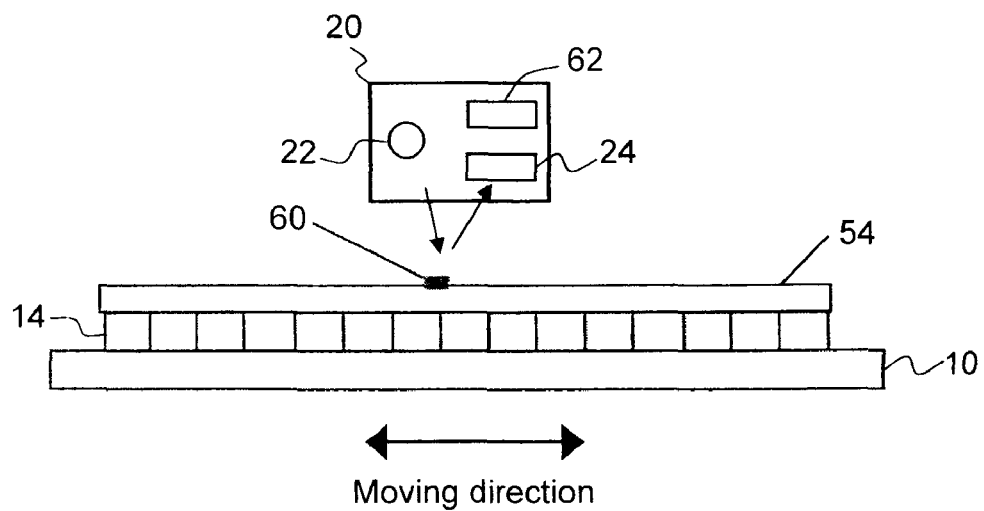
FIG. 10A is a side view which shows a constitution of Embodiment 4 of the present invention and FIG. 10B is a plan view thereof.
Figure 10B:
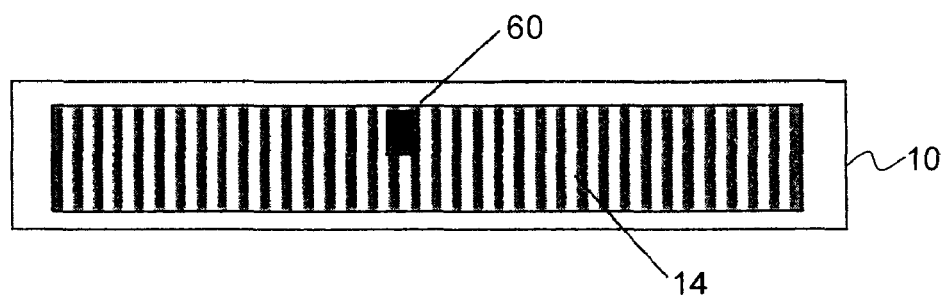

Next, a constitution of Embodiment 4 of the present invention is shown in FIG. 10A (side view) and FIG. 10B (plan view).

As shown in FIG. 10A, the detector 20 of the present embodiment is provided with the light source 22 and the light-receiving element 24 for detecting main signal, as with the conventional example given in FIG. 1A.

Further, only one main track 14 is arranged on the scale 10 used in the present embodiment, as shown in FIG. 10B. As shown in FIG. 10A, a transparent scale protective film 54 for preventing the scale 10 from being blurred or damaged is provided on a scale surface of the scale 10 and integrally formed with the scale 10 by adhesion or molding.

The scale protective film 54 can be made of glass, a plastic film or others.

In the present embodiment, at a part (above in the drawing) in a direction orthogonal to a moving direction of one site or a plurality of sites of the scale protective film 54 in the moving direction, a material lower in permeability than the scale protective film 54 or an opaque material is formed as a film 60 for a monitor signal.

Figure 11:
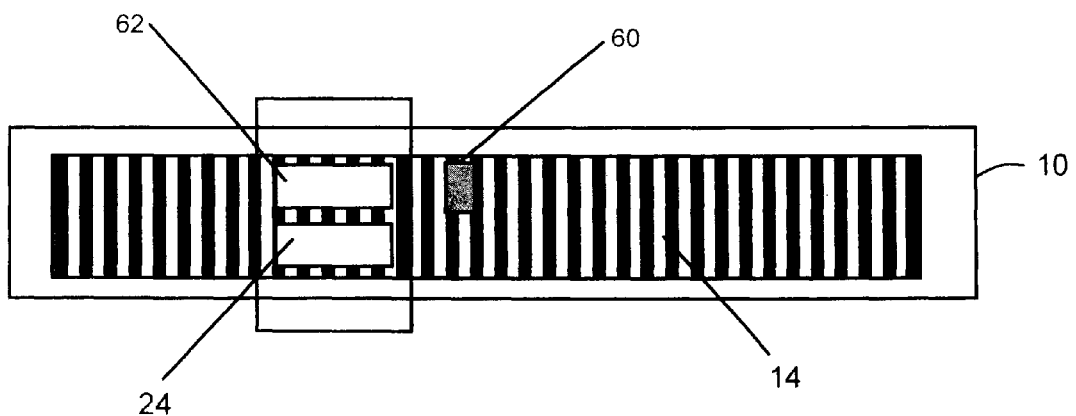
FIG. 11 is a plan view which shows a relationship between a scale and a detector of Embodiment 4.

On the other hand, as shown in FIG. 10A, an array-shaped light receiving element 24 for detecting a main signal and an array-shaped light receiving element 62 for detecting a monitor signal are arranged in parallel in the moving direction at the detector 20 which is arranged so as to oppose the scale 10. Further, these two light receiving elements 24, 62 are arranged, as shown in FIG. 11, at the same position in the moving direction so as to output an in-phase signal with respect to movement on the scale 10.

Since other constitutions are the same as those of the conventional example shown in FIG. 1A and FIG. 1B, they will not be described here.

Figure 12:
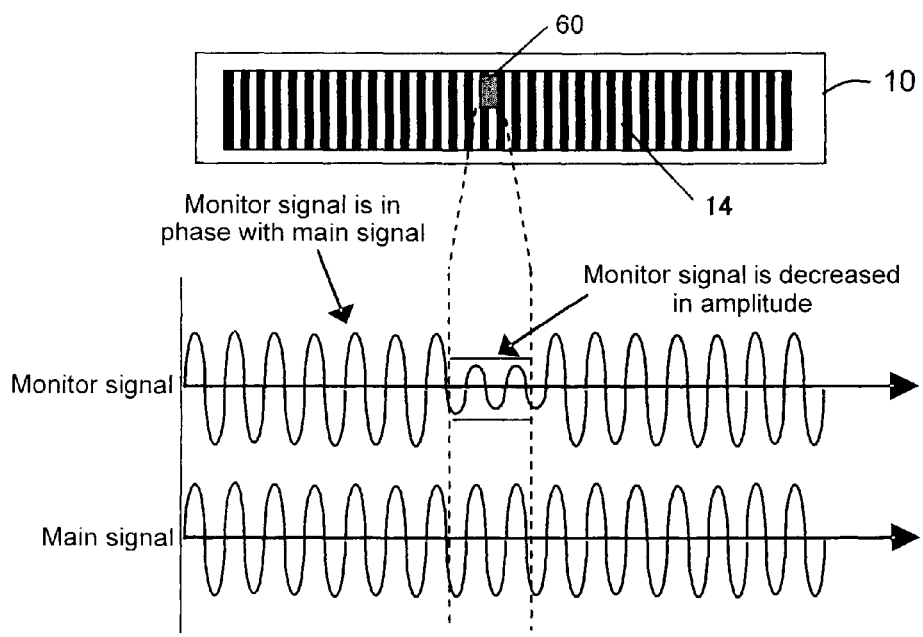
FIG. 12 is a drawing which exemplifies a relationship between a monitor signal and a main signal output from a light receiving element of Embodiment 4.

In the present embodiment, the monitor signal and the main signal are in-phase signals as shown in FIG. 12 and also are approximately equal in level of amplitude at a part other than the film 60 for monitor signal. However, when the detector 20 passes over the film 60 for monitor signal, the monitor signal keeps in phase with the main signal, with only the amplitude being decreased, because the film 60 monitor signal is lower in permeability than a material of the scale protective film 54.

Therefore, a differential circuit 50 of the main signal and the monitor signal similar to that of Embodiment 1 and shown in FIG. 6 is internally housed at a processing circuit of the detector 20, thus making it possible to generate an origin signal, as shown in FIG. 13. That is, usually, an origin signal is extremely low in level of signal amplitude. However, where the detector 20 opposes the film 60 for monitor signal, the origin signal is increased in level of amplitude, thus making it possible to detect an origin. In this instance, since the main signal and the origin signal are detected by the same main track 14 provided on the scale 10, these signals are constantly equal in phase relationship to improve the reproducibility of the origin.

Figure 14A:
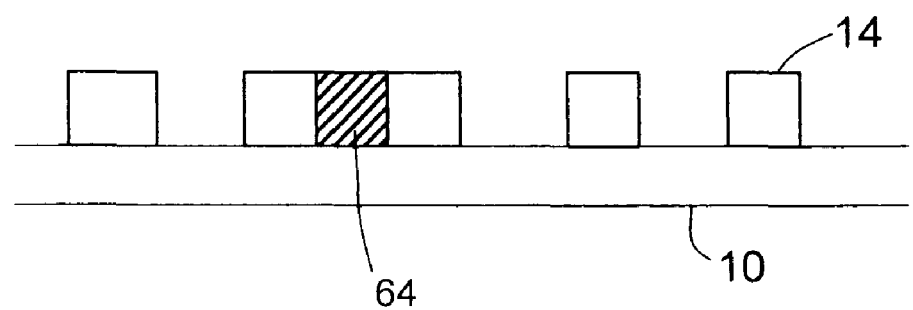
FIG. 14A is a side view which shows a major constitution of Embodiment 5 of the present invention.
Figure 14B:
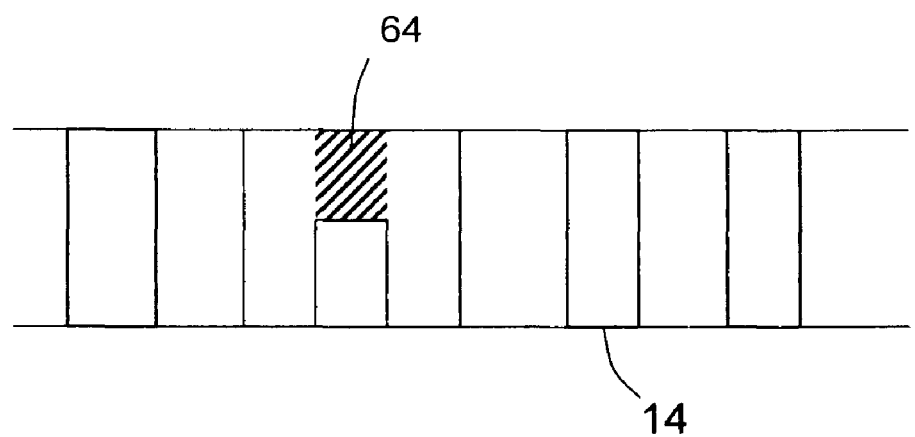
FIG. 14B is a plan view thereof.

The monitor signal generating portion is not limited to the film 60 for monitor signal formed on the scale protective film (transparent cover) 54. As shown in Embodiment 5 whose major constitution is shown in FIG. 14, the main track 14 can be partially processed (for example, spaces between gratings are filled) to form the monitor signal generating portion 64.

According to Embodiment 5, even where no scale protective film is available, it is possible to provide the present invention.

In any of the previous embodiments, the present invention is applied to a linear encoder in which the main track is arranged linearly to detect linear movement. However, it is also applicable to a circular encoder and a rotary encoder by arranging the main track in a circular arc shape.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the invention.

DESCRIPTION OF REFERENCE NUMERALS

10: Scale
14: Main track
14a, 54a: Origin detecting portion
20: Detector
22: Light source
24, 38: Light receiving element for main signal
30: Light receiving portion
34: Light receiving element for monitor signal
40: Central-voltage detecting circuit
42: Light-source automatic power control circuit (APC)
44: Monitor signal automatic gain control circuit (AGC)
50: Differential circuit for forming origin signal
52: Film
54: Scale protective film
60: Film for monitor signal
63: Light-receiving element for detecting monitor signal
64: Monitor signal generating portion

What is claimed is:

1. A photoelectric encoder having a scale in which a main track for detecting an amount of movement is formed in a measuring direction,
   the photoelectric encoder including an origin signal generating portion provided at a part of the main track in a direction orthogonal to the measuring direction, wherein
   change in a light receiving signal due to passage of the origin signal generating portion is detected to generate an origin signal.

2. The photoelectric encoder according to claim 1, wherein a track width of the origin signal generating portion is made narrower than the track widths of other portions.

3. The photoelectric encoder according to claim 2, wherein the origin signal generating portion is formed by concealing a part of the main track with a film.

4. The photoelectric encoder according to claim 2, wherein the origin signal generating portion is formed with a scale protective film.

5. The photoelectric encoder according to claim 1, further including:
   a light-source automatic power control circuit for giving feedback control to a main track illuminating light source so as to make constant the light receiving signal obtained from the main track;
   an automatic gain control circuit for attenuating the light receiving signal by an increment of the light emitting intensity by the light-source automatic power control circuit, thereby giving a monitor signal; and
   an origin signal generating circuit for generating the origin signal on the basis of a difference between the main signal and the monitor signal.

6. The photoelectric encoder according to claim 1 wherein
   the origin signal generating portion is a monitor signal generating portion different in light permeability from the main track, and
   the photoelectric encoder includes
   a light-receiving element for detecting main signal and a light-receiving element for detecting monitor signal provided together in a direction orthogonal to the measuring direction so as to output an in-phase signal with respect to the movement of the scale, and
   an origin signal generating circuit for generating the origin signal on the basis of a difference between the main signal and the monitor signal.

7. The photoelectric encoder according to claim 6, wherein the monitor signal generating portion is a part which is formed on a scale protective film and different in permeability from the scale protective film.

8. The photoelectric encoder according to claim 6, wherein the monitor signal generating portion is formed by processing a part of the main track.

9. The photoelectric encoder according to claim 2, further including:
   a light-source automatic power control circuit for giving feedback control to a main track illuminating light source so as to make constant the light receiving signal obtained from the main track;
   an automatic gain control circuit for attenuating the light receiving signal by an increment of the light emitting intensity by the light-source automatic power control circuit, thereby giving a monitor signal; and an origin signal generating circuit for generating the origin signal on the basis of a difference between the main signal and the monitor signal.

10. The photoelectric encoder according to claim 3, further including:

a light-source automatic power control circuit for giving feedback control to a main track illuminating light source so as to make constant the light receiving signal obtained from the main track;

an automatic gain control circuit for attenuating the light receiving signal by an increment of the light emitting intensity by the light-source automatic power control circuit, thereby giving a monitor signal; and an origin signal generating circuit for generating the origin signal on the basis of a difference between the main signal and the monitor signal.

11. The photoelectric encoder according to claim 4, further including:

a light-source automatic power control circuit for giving feedback control to a main track illuminating light source so as to make constant the light receiving signal obtained from the main track;

an automatic gain control circuit for attenuating the light receiving signal by an increment of the light emitting intensity by the light-source automatic power control circuit , thereby giving a monitor signal; and an origin signal generating circuit for generating the origin signal on the basis of a difference between the main signal and the monitor signal.

* * * * *